United States Patent [19]

Pandolfe

[11] 4,383,769

[45] May 17, 1983

[54] HOMOGENIZING APPARATUS AND METHOD

[75] Inventor: William D. Pandolfe, Billerica, Mass.

[73] Assignee: Gaulin Corporation, Everett, Mass.

[21] Appl. No.: 224,108

[22] Filed: Jan. 12, 1981

Related U.S. Application Data

[63] Continuation-in-part of Ser. No. 116,601, Jan. 29, 1980, Pat. No. 4,352,573.

[51] Int. Cl.³ .............................................. B01F 5/06
[52] U.S. Cl. ....................................... 366/337; 137/1; 137/15; 251/121; 366/340
[58] Field of Search ................ 366/138, 182, 348, 176, 366/336–340; 137/1, 15, 625.3, 625.33; 138/46, 42; 251/121, 212

[56] References Cited

U.S. PATENT DOCUMENTS

| | | |
|---|---|---|
| 366,169 | 7/1887 | Hyatt . |
| 973,328 | 10/1910 | Willmann . |
| 996,704 | 7/1911 | Cribbins . |
| 1,070,218 | 8/1913 | Willmann . |
| 1,070,226 | 8/1913 | Becker . |
| 1,112,594 | 10/1914 | Brawner, Jr. . |
| 1,436,947 | 11/1922 | Davis . |
| 1,533,843 | 4/1925 | Ferns . |
| 2,882,025 | 4/1959 | Loo . |
| 3,179,385 | 4/1965 | Deackoff . |
| 3,526,391 | 9/1970 | Church, Jr. . |
| 3,732,851 | 5/1973 | Self . |
| 4,081,863 | 3/1978 | Rees ................................... 366/176 |
| 4,160,002 | 7/1979 | Janovtchik ........................... 99/453 |
| 4,205,696 | 6/1980 | Gongwer .............................. 137/1 |

FOREIGN PATENT DOCUMENTS 18059 of 1910 United Kingdom .

OTHER PUBLICATIONS

Kurzhals, "Investigations on the Physical and Technical Processes During High-Pressure Homogenization of Milk".
Loo, C. C. and M. Carleton, "Further Studies of Cavitation in the Homgenization of Milk Products", Dairy Science, 1953.
Loo, C. C., "Efficiency of a Milk Homogenizer Valve", Agricultural Engineering, May 1955, pp. 336-337.
"Gaulin Homogenizers and Pumps for the Food and Dairy Industries," Gaulin Corp. Brochure No. GFD 302.79.
"Gaulin Industrial Homogenizers, Pumps and Colloid Mills," Gaulin Corp. Brochure No. IND 302.75 5/79.

Primary Examiner—Philip R. Coe
Assistant Examiner—Timothy F. Simone
Attorney, Agent, or Firm—Hamilton, Brook, Smith & Reynolds

[57] ABSTRACT

A valve assembly includes a stack of valve members which define a number of annular valve slits between knife-edge valve seats and opposing valve surfaces. The valve members are rings having grooves formed therein to define a low pressure liquid chamber. A ridge between the central hole in each ring and the chamber groove forms the knife edge valve seat. Homogenizing pressure can be controlled by flexing a bearing plate at the end of the stack of valves. Spring elements between the valves bias the valves apart when they are released by the hydraulic valve actuator to enable cleaning of the valve slits.

36 Claims, 15 Drawing Figures

HOMOGENIZING APPARATUS AND METHOD

RELATED APPLICATIONS

This is a continuation-in-part of U.S. application Ser. No. 116,601, filed Jan. 29, 1980 for Homogenizing Method, now Pat. No. 4,352,573.

DESCRIPTION

TECHNICAL FIELD

This invention relates to homogenizing apparatus and methods and in particular to such apparatus in which the material to be homogenized is forced under high pressure through a valve slit.

BACKGROUND ART

Homogenization is the breaking down and mixing of the components of an emulsion or dispersion. A major use of homogenizers is to break down and disperse milk fat into the bulk of skim milk. This delays creaming of milk fat globules. Homogenizers are also used to process other emulsions such as silicone oil and to process dispersions such as pigments, antacids, and various paper coatings.

In the most widely used type of homogenizer, the emulsion is introduced at high pressure of from 500 psi to 10,000 psi to a central bore within an annular valve seat. The emulsion is forced out through a narrow gap between the valve seat and a valve plate. Through the gap, the emulsion undergoes extremely rapid acceleration as well as an extreme drop in pressure. This violent action through the valve breaks down globules within the emulsion to produce the homogenized product.

The degree of homogenization is a function of the difference between the pressure of the emulsion at the inlet to the valve and the pressure at the outlet. Past systems for homogenizing milk have, for example, used an inlet pressure in the order of 2,000 psi. Recently, in an effort to conserve the amount of energy required to homogenize milk and other products to a predetermined degree, attempts have been made to reduce that required homogenizing pressure. Such attempts have not resulted in the same degree of homogenization possible with higher pressures. An object of the present invention is to provide a method and apparatus for homogenizing to a desired degree but at lower pressures than has heretofore been possible. By homogenizing at lower pressures, less energy input is required at the liquid pump.

The exact mechanism by which homogenization occurs is not absolutely known; however, current theories and experimental evidence indicate that cavitation and turbulence are the primary forces responsible for the homogenization phenomenon. Based on those theories, Hans-Albert Kurzhals has concluded that a knife edge valve seat provides optimal valve geometry. Kurzhals used a knife edge valve in which the travel distance through which the fluid accelerated was about 0.004 inches. His experimental work was limited to the low flow rates of a laboratory environment, however.

Also relying on the cavitation theory, Ching C. Loo had previously designed a homogenizing valve having an annular knife edge valve seat spaced 0.001 inch from an opposing valve surface. In his U.S. Pat. No. 2,882,025, Loo suggested a stacked configuraion of valve members. Despite his ability to obtain homogenization at low pressures, the Loo homogenizer has not gained wide acceptance.

A further object of this invention is to provide a commercially acceptable homogenizing method and apparatus for homogenizing emulsions and dispersions at flow rates of up to the order of 14,000 gallons per hour at a substantially reduced homogenizing pressure than is conventionally used.

DISCLOSURE OF THE INVENTION

It has been determined that there is an optimum gap which should be maintained in a knife edge type homogenizing valve. That gap is very small and heretofore has, with the possible exception of the Loo work, only been considered for very low flow rates; with the present homogenization method, that very small gap is used for even greater flow rates. To provide for increased flow rate at a given homogenizing pressure, the length or number of the valve slits is increased. For example, by stacking many narrow slit valves in parallel fluid circuits the degree of homogenization can be increased for a given pressure and flow rate because each valve slit has a critical, optimum gap. Similarly, several optimal valve slits can provide the same degree of homogenization with less homogenizing pressure.

For optimum operation, a knife edge valve seat provides a restricted passageway of a land or travel distance less than about 0.060 inches and is spaced less than about 0.003 inches from a valve plate. Preferably, the gap is about 0.001 inch. In its preferred form, the valve seat is annular and thus forms an annular restricted passageway with the valve plate. To provide for an increased flow rate at a given pressure, several valve members, each serving as the valve seat for one slit and a valve plate for another slit, are stacked. The valve members also separate inner and outer chambers, one of which holds a supply of pressurized fluid and the other of which is at a lower pressure. The fluid is expressed radially through parallel passageways, the gap of each passageway being optimally dimensioned.

Stacking a plurality of valve members to define a number of annular valve slits of predetermined gaps presents many problems solved by this invention. Such problems include that of minimizing wear, maintaining an optimum gap, properly aligning the number of valve members within a housing without chattering of the valve members during operation, that of controlling homogenizing pressure for a given flow rate or vice versa, and that of cleaning the valve assembly between processing of different liquids.

In accordance with the principles of this invention, the homogenizing pressure for a given flow rate can be varied by varying the number of valve slits in the assembly; and in an assembly having a given number of valve slits the pressure can be adjusted a lesser amount of flexing an end valve member to close at least the slit adjacent to that valve member. That flexing offers infinitely variable control even though the valve members are machined to provide a predetermined slit gap.

The valve surfaces should be of a hard material to minimize wear at the narrow valve slits. On the other hand, a member which is to be flexed should be sufficiently soft to prevent fracture under the high stresses resulting from a rigid valve actuator acting against high homogenizing pressures. Thus, in a preferred form, the endmost valve member which is flexed by a rod pressed at its center is made of a relatively soft material, and a flat ring of hard material is affixed to that end valve member. A counterbore is formed at the center of the end valve member to align a valve actuating rod. By providing a counterbore on each face of the member and a hard valve surface on each face, this member can be reversible.

To allow for cleaning of the valve, spring elements are positioned between the valve members. When the clamping pressure on the stack of discs is released, these springs spread the discs for cleaning of the slits. To prevent rubbing of the disc against the surrounding housing, those discs are preferably spaced inward from the housing and are held in alignment by the springs.

As the preferred structure of each valve member, a chamber groove is formed in one face of a ring and a knife edge valve seat forms a ridge between the central hole in the ring and the chamber groove. A flat valve surface is aligned with the valve seat on the opposite side of the ring between the center hole and another chamber groove. A peripheral rim has flat axially directed surfaces, other nearly coplanar with the valve seat. The latter rim surface is spaced axially a predetermined amount from the knife edge to assure a gap between the valve seat and the flat valve surface of the next valve member. A plurality of axial fluid passageways are provided through the ring from the chamber groove. A spring groove may be provided in each of the rim surfaces.

The number of valve slits within a valve assembly can be changed by changing the length of a cylindrical housing and the number of valve members within that housing, by changing the number of valve members within a housing and also changing a spacer in the housing, or by changing the number of valves within the housing which are in an operative position between high and low pressure regions in the assembly.

BRIEF DESCRIPTION OF THE DRAWINGS

The foregoing and other objects, features and advantages of the invention will be apparent from the following more particular description of a preferred embodiment of the invention, as illustrated in the accompanying drawings in which the like reference characters refer to the same parts throughout the different views. The drawings are not necessarily to scale, emphasis instead being placed upon illustrating the principles of the invention.

PREFERRED EMBODIMENTS OF THE INVENTION

Figures 1, 2:
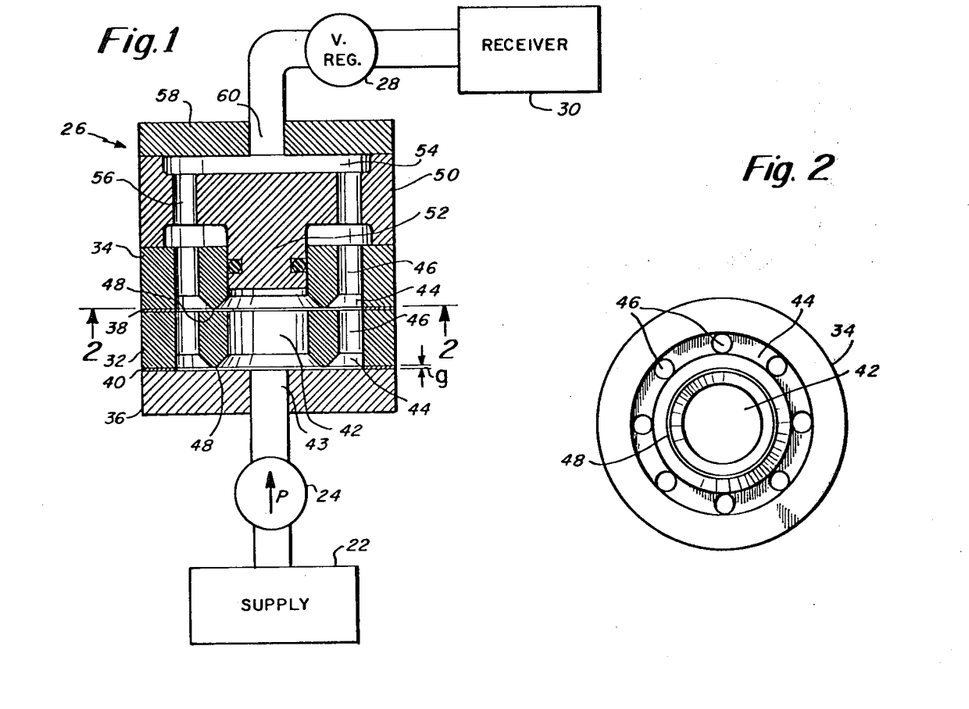
FIG. 1 is an elevational section of a homogenizing valve embodying this invention and having two annular valve slits.
FIG. 2 is a cross sectional view of the homogenizing valve of FIG. 1 taken along line 2—2.

As with many conventional homogenizing systems, an emulsion or dispersion which is to be homogenized is pumped at a high pressure from a supply 22 by a pump 24 (FIG. 1). The high pressure fluid is delivered to a primary valve 26. The homogenized liquid from the valve 26 is then passed through a back pressure regulating valve 28 to a liquid receiver 30. The valve 28 establishes the back pressure within the valve 26 and may simply be a flow restriction of any sort. The preferred back pressure is between 5% and 20% of the pressure at the inlet to valve 26. A back pressure of about 10% has been found particularly suitable.

The valve 26 is not conventional. In this case, it includes two valve members 32 and 34. The valve members 32 and 34 are spaced from each other and from a support plate 36 by precision annular shims 38 and 40. Each valve member 34, 32 has a central hole 42 therethrough. These holes jointly define an inner high pressure chamber in communication with an inlet port 43 in the support plate 36. A groove 44 is formed on the lower surface of each valve member concentric with the central hole 42. The grooves 44 are in fluid communication with each other through axial ports 46, and together the grooves and ports define a low pressure chamber.

The walls between the central holes 42 and the grooves 44 are chamfered to provide knife edges 48. Each knife edge 48 forms a valve seat spaced a small distance above an opposing valve surface. The support plate 36 provides the valve surface below the valve seat on member 32, and the upper surface of member 32 serves as the opposing valve surface for the valve seat of member 34. In the case shown, the shims 38 and 40 provide a predetermined, precise spacing between each knife edge and valve plate. Alternatively, each knife edge could be formed slightly higher than the outer rim of the valve member to provide the desired spacing.

The upper valve member 34 is capped by a valve retainer 50. A central plug 52 on the retainer 50 closes the central hole 42 of the upper valve member 34. A recess 54 in the retainer 50 forms an upper low pressure manifold, and axial ports 56 in the retainer provide fluid communication between that manifold and the low pressure chamber in the valve members 32 and 34. The valve assembly is closed by a cap 58 which provides an outlet port 60.

Although the system is here described as having high pressure emulsion applied to the port 43 and homogenized liquid taken from port 60, the ports may be reversed such that the holes 42 serve as the low pressure chamber and the outer grooves 44 serve as the high pressure chamber. This could be accomplished, for example, by simply inverting the valve assembly 26 in the system shown.

Figure 3:
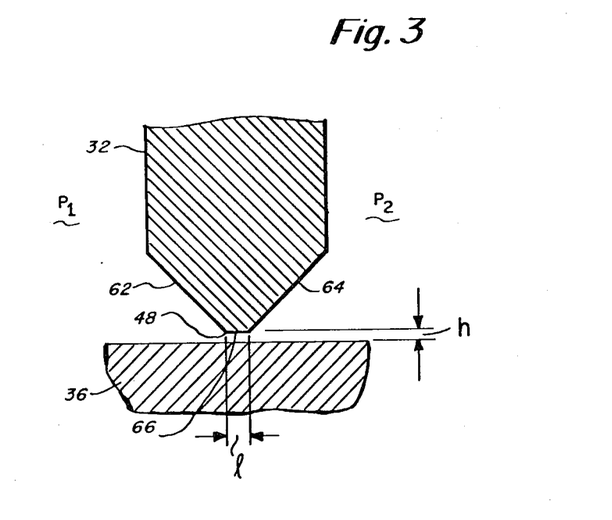
FIG. 3 illustrates a portion of the knife edge valve slit greatly enlarged.

A portion of the knife edge 48 on valve member 32 is shown greatly enlarged in FIG. 3. The knife edge is formed by two chamfered surfaces 62 and 64 formed at about 45° from the valve plate 36. A land surface 66 extends between the chamfered surfaces parallel or near parallel to the valve plate 36. This land surface, along with the opposing surface of plate 36, defines a restricted passageway through which the emulsion is expressed. The length l of that land surface between the high and low pressure chambers is the primary feature that distinguishes a knife edge valve seat. It is across that length l that the fluid at high pressure P1 and near zero velocity undergoes extreme acceleration and pressure reduction to the low back pressure P2. Experiments have shown that to make significant use of this invention, that is to provide a high degree of homogenization at a lower value of P1, the length l of the land surface should be no greater than about 0.060 inches.

Figure 4:
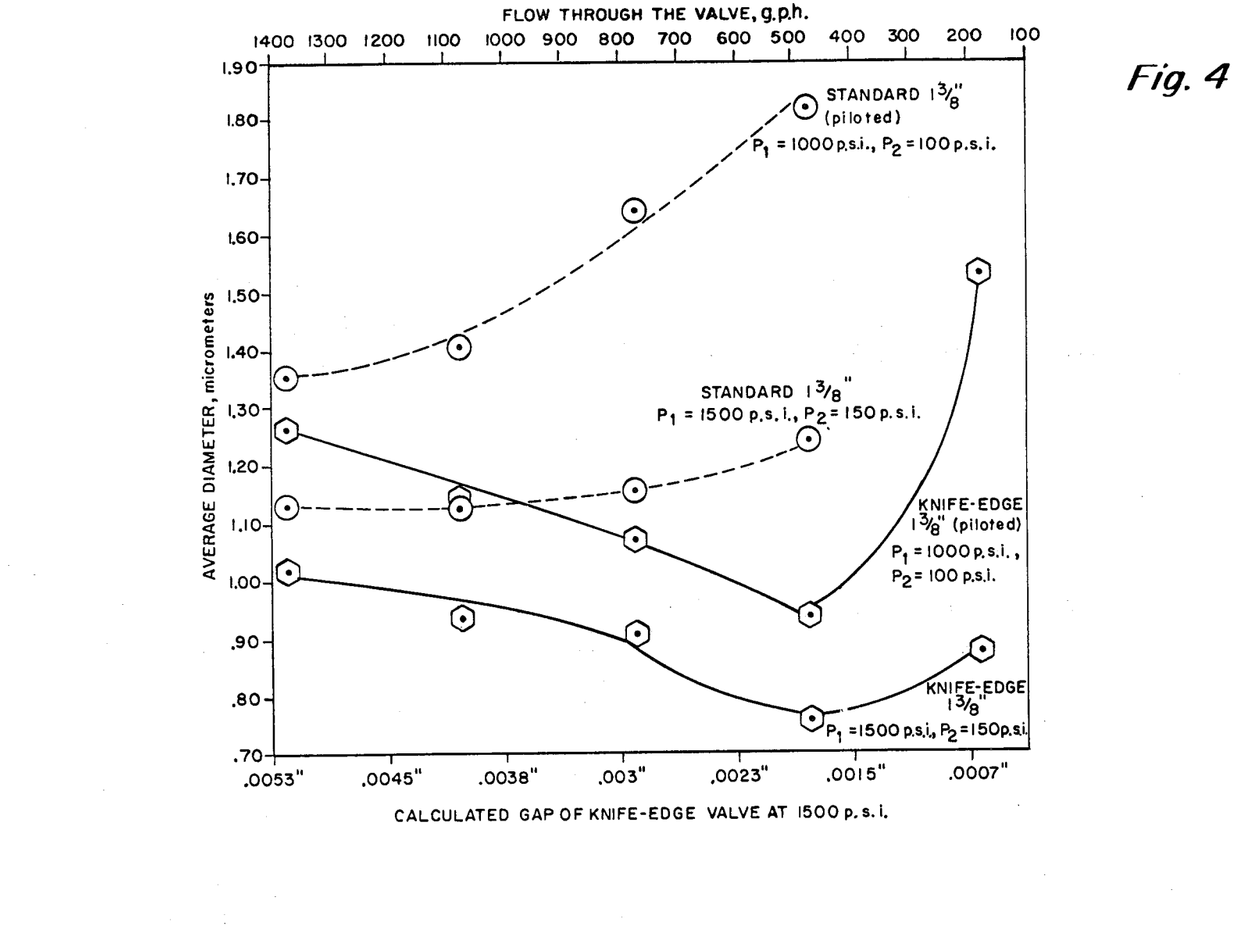
FIG. 4 is a plot of the average diameter of globules in a homogenized product against flow rate and calculated valve gap graphically illustrating the criticality of the gap of the knife edge valve.

A primary aspect of this invention is that the gap, or height, between the land surface 66 and the surface of plate 36 is critical. Experiments have shown that the gap h should not be increased to allow for increased emulsion flow; rather, the gap should be held to less than 0.003 inches. More specifically, a gap of 0.001 inches has been found to be near optimum. Initial test results are shown in FIG. 4 for a valve having a single annular slit. The valve was spring actuated; that is, the two valve members were pressed toward each other by a spring. Liquid was supplied to the valve by a constant flow pump and flow through the valve was controlled by bypassing some liquid. By adjusting the spring force, the space between the valve members, and thus the pressure, was controlled. The average diameter of the globules in the emulsion product were then plotted against flow rate. From the flow rate, fluid pressures and valve geometry the gap could then be calculated. The calculated gap is shown for the valve operating at 1500 psi inlet pressure. FIG. 4 shows that the degree of homogenization increases, or the globule size decreases, as the gap of a knife edge valve decreases. A strong contrast can be seen in the decrease in homogenization with a conventional flat valve as the gap height h is decreased. The emulsion used in the test was filled milk of 3.5% corn oil, 8% non-fat milk solids and 88.5% water. The average emulsion droplet diameter was determined using a recognized spectroturbidimetric technique.

Figure 5:
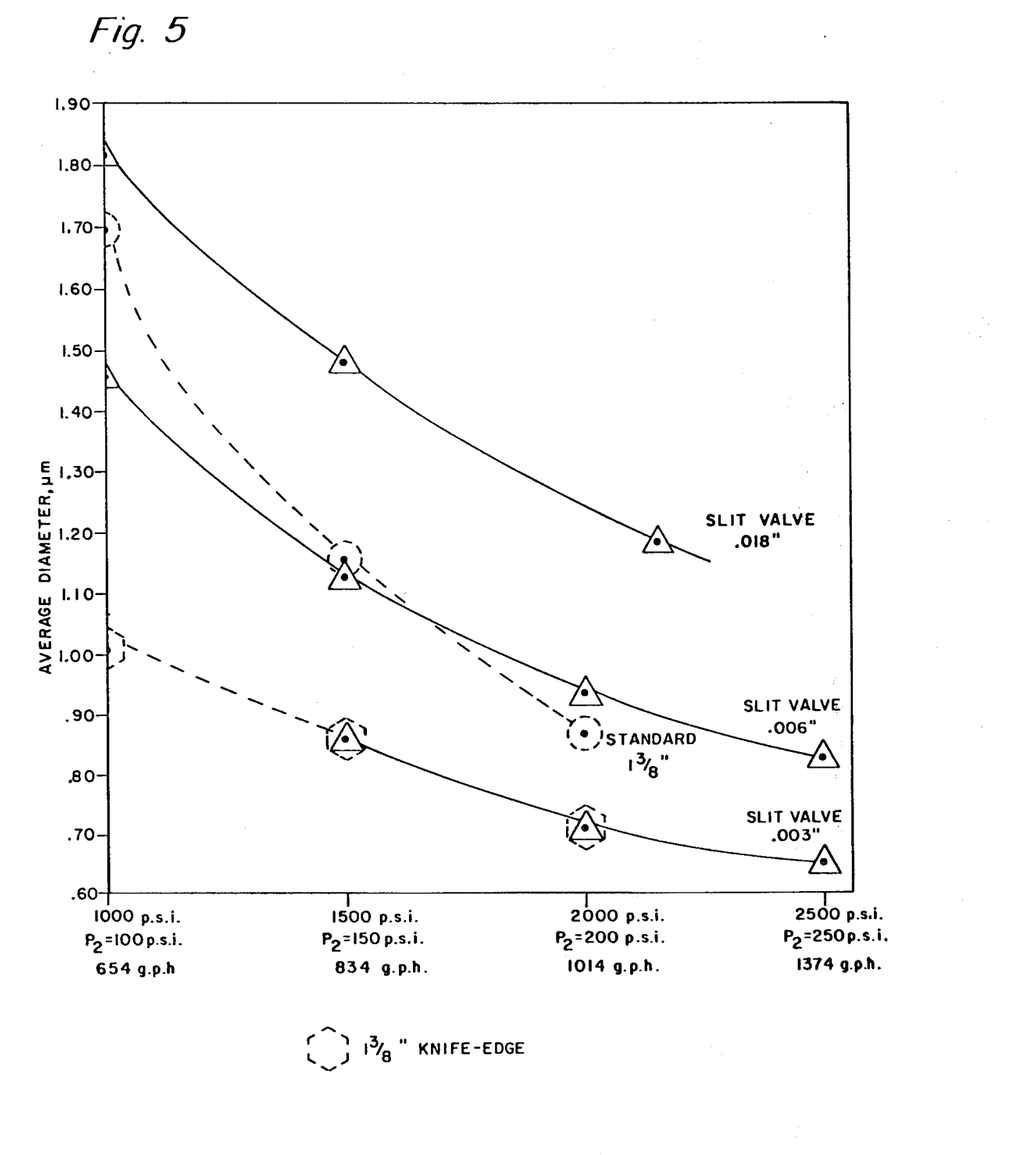
FIG. 5 is a graph of average globule diameter against pressure for three linear slit valves having different gaps.
Figure 6:
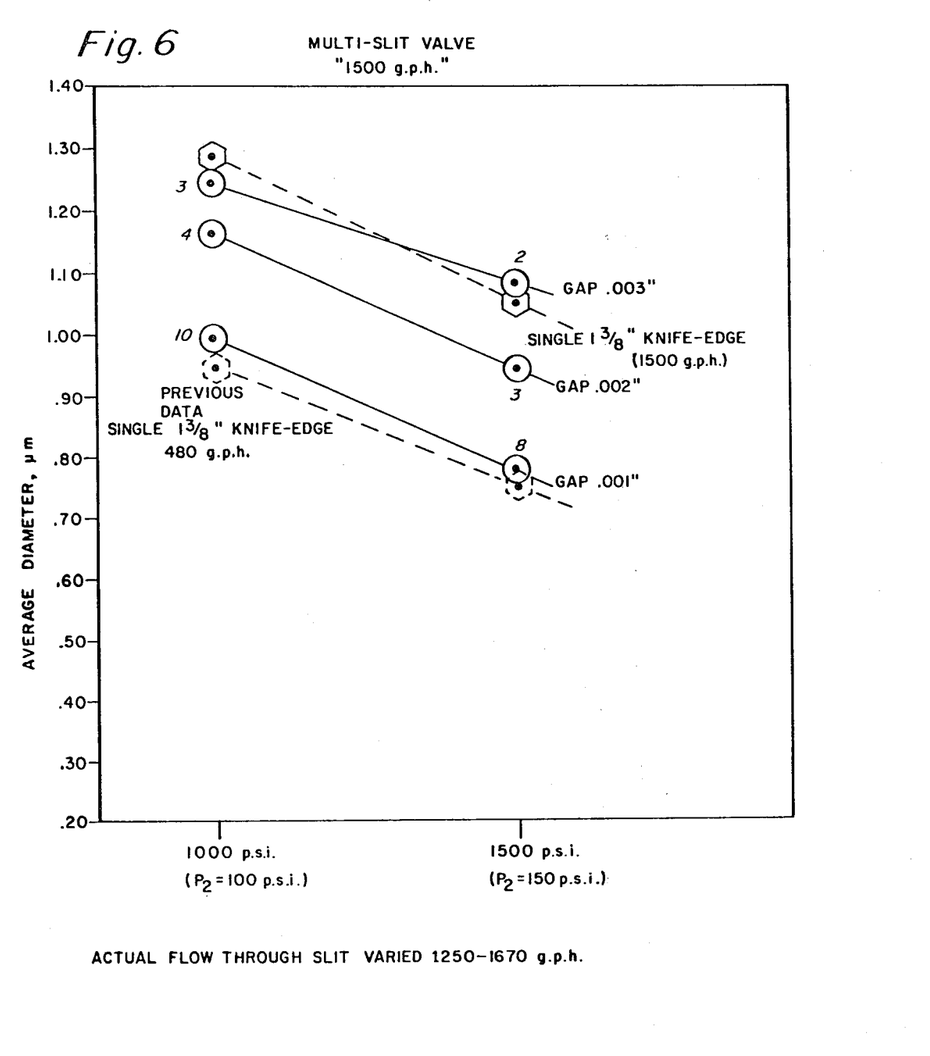
FIG. 6 is a graph of average globule diameter against pressure for stacked valve assemblies as shown in FIG. 7; the graph indicates increasing homogenization with decreasing gap for a given homogenizing pressure and flow rate.

Similar results can be seen in FIGS. 5 and 6. In FIG. 5 the average globule diameter is plotted against pressure for three linear slit valves similar to those described in U.S. Pat. No. 4,081,863 to Rees. To provide equal flow rates, the slit cross sectional areas of the three valves were equal: one valve had a gap of 0.018 inch and a length of 0.75 inches; a second valve had a gap of 0.006 inch and a length of 2.25 inches; and a third valve had a gap of 0.003 inch and a length of 4.50 inches. It can be seen from the data in FIG. 5 that as the gap becomes smaller the homogenizing efficiency increases. Results from a standard annular valve and from a knife edge annular valve are indicated in broken lines on this graph for comparison. It is significant that the 0.003 inch knife edge annular valve data points correspond to the 0.003 inch knife edge linear slit valve data points. This indicates that the efficiency of the small gap, knife edge valve is not dependent on the shape of the valve slit. The annular slit configuration has been dictated by other considerations, however.

FIG. 6 indicates the improved homogenizing efficiency which may be achieved at a given flow rate by reducing the gap of a knife edge annular slit valve. To maintain a nominal 1500 gallon per hour flow rate at both 1000 psi and 1500 psi homogenizing pressures and at gaps of 0.003 inch, 0.002 inch and 0.001 inch, additional valve members were stacked to provide from two to ten parallel annular slits. The specific number of valve slits provided in each assembly for which the data was plotted is shown adjacent each data point. FIG. 6 shows that for a given homogenizing pressure and a given flow rate, the homogenizing efficiency can be increased by reducing the gap and increasing the total slit length of the valve assembly. FIG. 6 also indicates that the high homogenizing efficiency attained at 480 gallons per hour with a single annular knife edge valve (FIG. 4) can be obtained for about three times that flow rate using a multislit valve. However, as the gap is widened to about 0.003 inch the results obtained are comparable to those obtained with a single slit knife edge valve of wider gap. Thus, to make full use of this invention it is important that the gap be held to less than 0.003 inch.

When the total slit length is controlled by the number of valve rings, it is varied by discrete amounts. Thus, the 1500 gallons per hour is only a nominal flow rate, and the actual flow through the assembly varies from 1250 gallons per hour to 1670 gallons per hour.

Figure 7:
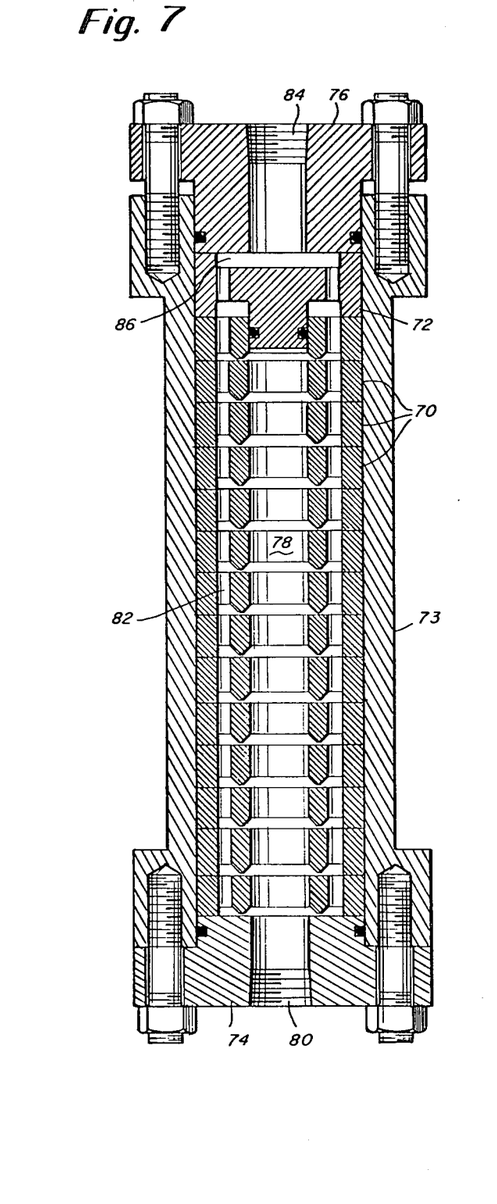
FIG. 7 is a more detailed elevational view of another embodiment of the invention.

A valve assembly suitable for high flow rate homogenizing systems and used to obtain the data of FIG. 6 is shown in FIG. 7. This valve assembly includes 14 valve members 70 stacked in the same manner that valve members 32 and 34 are stacked in the embodiment of FIG. 1. A valve retainer 72 is provided as before. The valve members 70 and retainer 72 are surrounded by a cylindrical outer casing 73 to which end plates 74 and 76 are bolted. As before, a central bore 78 is defined by the many valve members. The bore 78 is in fluid communication with an inlet/outlet port 80. An outer chamber 82 defined by the many peripheral ports in the valve members is in fluid communication with an inlet/outlet port 84. By providing a plurality of knife edge valve seats, each gap can be held to less than 0.003 inches while still providing for a high flow rate of a given homogenizing pressure and back pressure.

Figure 8:
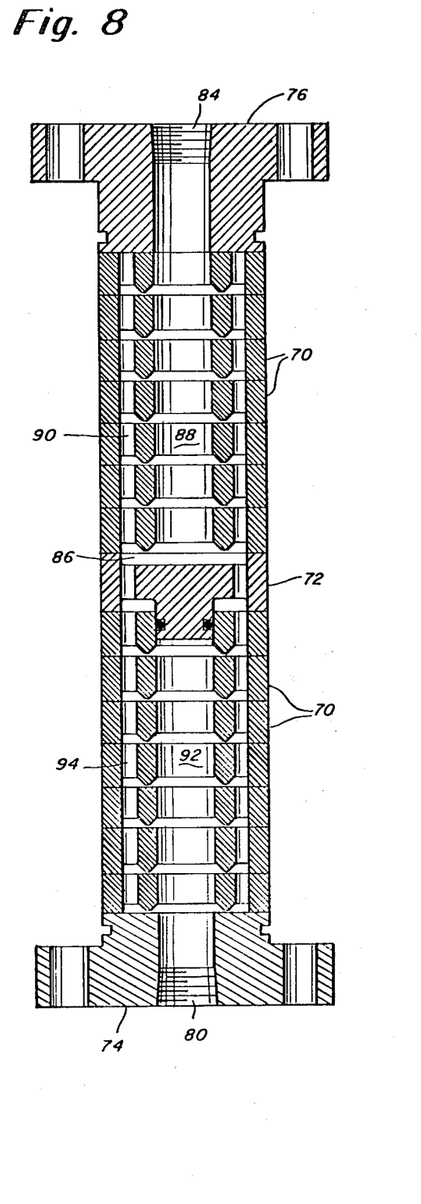
FIG. 8 is an elevational sectional view of just the valve members of the embodiment of FIG. 7 but with a slit bypassing member repositioned to provide a reduced number of functional homogenizing slits.

FIG. 8 indicates the manner in which the valve assembly of FIG. 7 can be customized to provide for reduced flow rates at a given homogenizing pressure or to allow for the use of higher homogenizing pressures without increasing the flow rate. Within the casing 73, the retainer 72 and a number of the valve members 70 are rearranged such that the retainer 72 provides a bypass around the valve members above it. The manifold 86 in the retainer 72 equalizes the fluid pressure between the central bore 88 of the upper valve members and the peripheral ports 90 of those valve members. The pressure differential is maintained, however, between the central bore 92 of the lower valve members and the peripheral ports 94. Thus, the total cross sectional area of the homogenizing valve slits is reduced. If the homogenizing pressure of the emulsion is held at the same pressure as with a full stack of valve members, the flow rate is reduced. Similarly, the flow rate can be held to the same level as with the arrangement of FIG. 7 if the homogenizing pressure is increased accordingly.

This embodiment illustrates an important feature of the present invention. In past commercial homogenizing systems the homogenizing pressure for a valve having a given circumference was determined by the flow rate and the gap between the valve seat and the plate. In accordance with the present invention that gap is held within a critical optimal range for all flow rates and pressure of the assembly. Pressure is determined by the flow rate and the total cross sectional area of the valve slits.

For a gap of 0.001 inches, a homogenizing pressure of 2000 psi and a back pressure of 200 psi the following flow rates can be obtained by providing the total slit lengths indicated:

| | |
|---|---|
| 500 gph | 6.9 in. |
| 1,500 gph | 20.7 in. |
| 3,500 gph | 48.3 in. |
| 6,000 gph | 82.8 in. |
| 7,500 gph | 103.5 in. |
| 10,000 gph | 138.0 in. |
| 14,000 gph | 193.2 in. |

Figure 9:
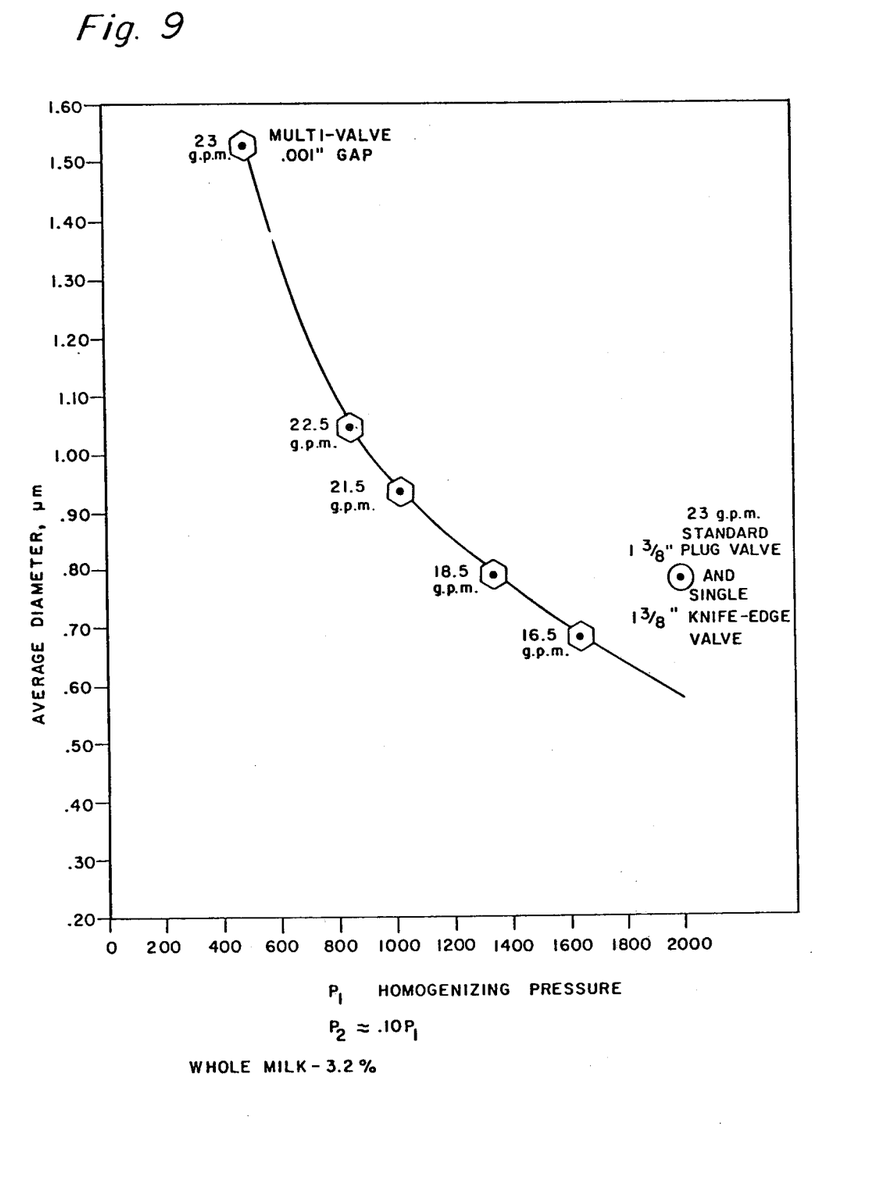
FIG. 9 is a plot of the average diameter of globules in a homogenized product against homogenizing pressure for the embodiment of FIG. 7 and for a normal operating condition of a conventional valve.

The graph of FIG. 9 shows the results of a test of the homogenizing valve of FIGS. 7 and 8. A single run of a conventional valve is also shown for comparison. In both cases the homogenizer pumped at a rate of 23 gpm, but some of the flow was bypassed when the knife edge valve was tested. It can be seen that the same degree of homogenization can be obtained at a much lower pressure using the valve of this invention. The power requirement for homogenizing a unit of emulsion is proportional to the product of flow rate and homogenizing pressure. Thus the power ratio of the novel and conventional valves at an average homogenized diameter of 0.8 micrometer is:

$$\frac{23 \times 1350}{23 \times 2000} = .675$$

Thus, the power requirement is reduced by almost one third using the valve of this invention.

Figure 10:
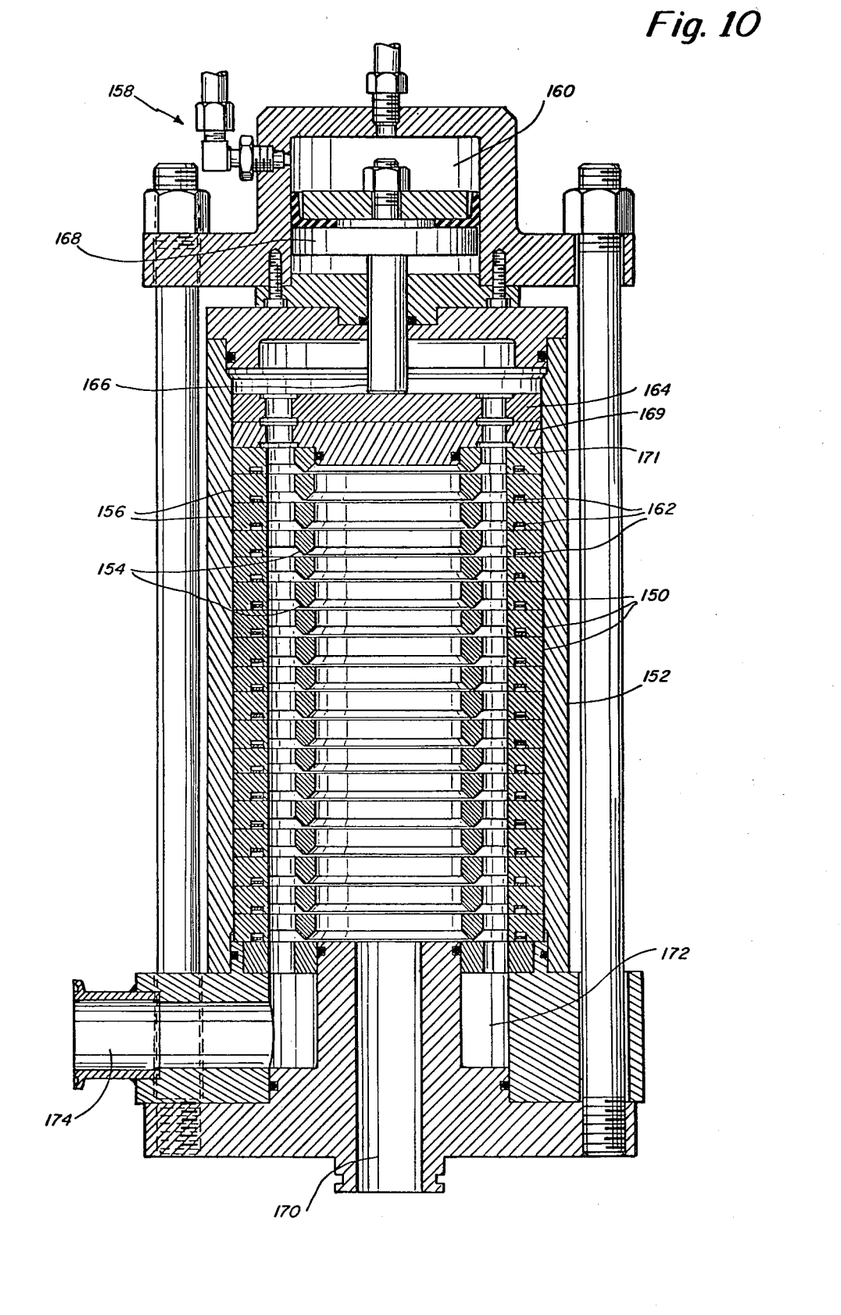
FIG. 10 is an elevational sectional view of a production model of the invention having a hydraulic valve actuator.

A modification of the stacked ring valve is shown in FIG. 10. As before, this embodiment includes a plurality of valve members 150 stacked within a cylindrical casing 152. In this case, the valve seats 154 are machined so that each is slightly higher than the outer rim 156 of each valve member. This provides the optimum valve gap without the use of shims.

The embodiment of FIG. 10 also includes a hydraulic valve actuator (HVA) 158 which allows for widening of the valve slits to purge any sediments which may have collected in the slits. To that end, high pressure hydraulic fluid presses downwardly against a piston 168 to force a piston rod 166 against a pressure distributing plate 164. The plate 164 is thereby forced downwardly against the stack of rings to compress wave springs 162 positioned between the valve members. With the valve members thus pressed closely against each other the optimum spacing is provided between the valve seats and the opposing valve surfaces. If, on the other hand, the pressure in chamber 160 is reduced, the springs 162 are able to spread the valve members apart to increase the valve gaps in a valve cleaning operation.

The HVA 158 is positioned above the stack of valve members 150, and both the inlet and outlet ports are provided at the lower end of the assembly. High pressure fluid is directed to the center chamber within the stack of valve members by an inlet port 170. The fluid is then expressed radially out through the valve slits into the peripheral low pressure chamber provided by the valve members. The low pressure homogenized fluid is then directed downward to an annulus 172 and outward through the outlet port 174.

Where the use of a valve actuator such as shown in FIG. 10 is desirable, it is important that the diameter of the valve members not be so large as to make the valve actuator too cumbersome. The upward force against the valve actuator is equal to the wave spring force plus the product of the fluid pressure within the central high pressure chamber and the projected area of the retainer 169 and top valve ring 171 exposed to that high pressure. Similarly, the downward compressive force against the stack of valve members is equal to the product of the hydraulic pressure in chamber 160 and the top surface area of piston 168. If only a few large diameter valve members were utilized, a large diameter HVA would be required to overcome the upward force at a reasonable hydraulic pressure. However, by stacking a large number of valve members to obtain the desired flow rate, the diameter of retainer 169 and thus the size of the HVA can be minimized.

Another model of valve assembly embodying this invention is shown in FIGS. 11-14. With minor modifications, this assembly can be provided with from eleven to fifteen stages, that is eleven to fifteen annular valve slits. An eleven stage configuration is shown. The valve members include ten disc valves 200, a blank disc valve 202 and a bearing plate 204. The valve members are clamped together by a valve rod 206.

Details of a disc valve are shown in FIGS. 11-14. Each disc valve is a ring, and the center holes 208 in the disc valves jointly form a high pressure fluid chamber. When clamped together, the flat peripheral rim surfaces 210 and 212 of respective disc valves abut. Spring grooves 214 and 216 are formed in the surfaces 210 and 212. As before, a spring washer is positioned in these spring grooves between each valve member so that the disc valves may be separated to clean the slits.

Figure 11:
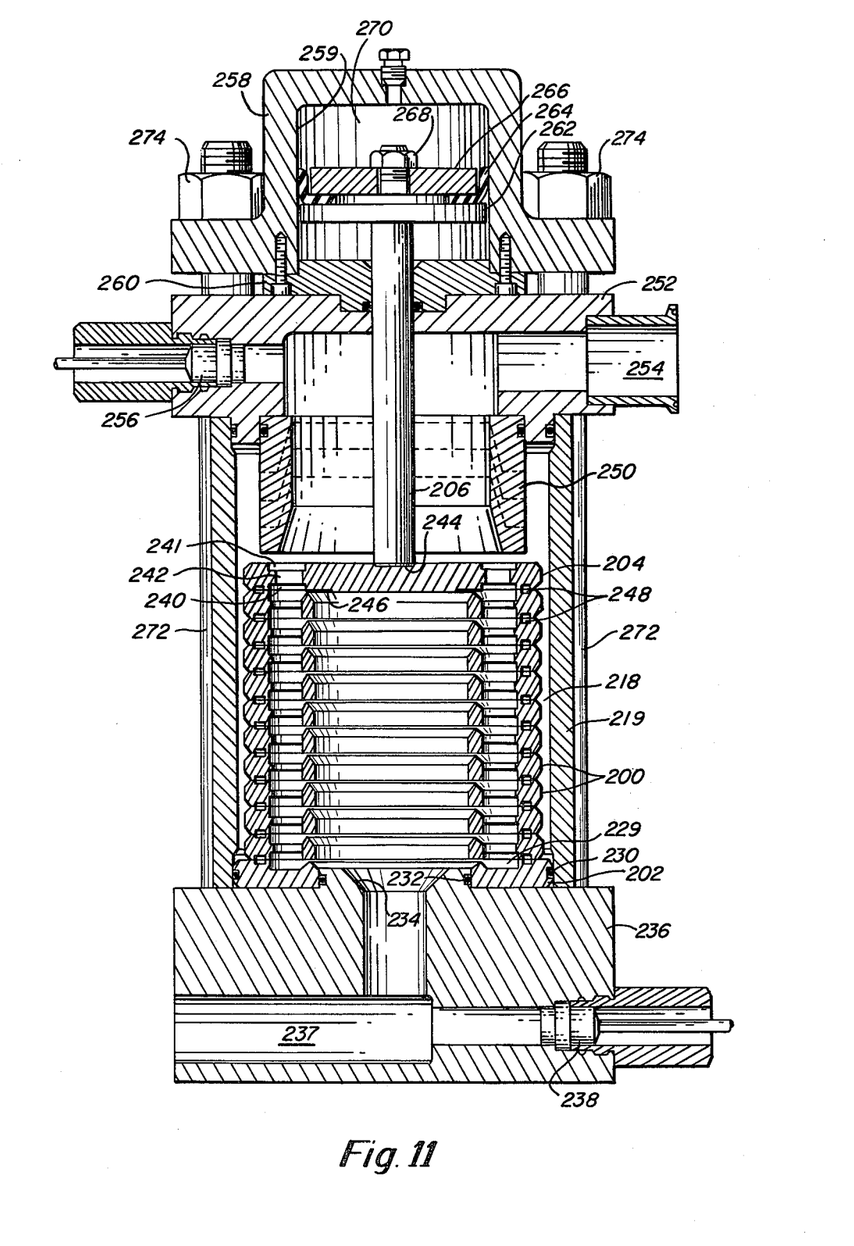
FIG. 11 is an elevational sectional view of yet another production model of the invention having a hydraulic valve actuator and allowing for a variable number of valve members.

It can be seen in FIG. 11 that a large space 218 is provided between the stack of valve members and the cylindrical housing 219. This space eliminates chattering which results with collection of deposits along the wall of the housing 219 if the disc valves are closely fit within that housing. With the valves thus spaced from the housing, means must be provided to keep them properly in alignment. To that end, a spring groove is formed in each face of each disc valve so that the annular springs, fitted within these grooves, hold the valves in alignment. It can be seen then that the valve members are clamped together by the valve rod 206 but are otherwise free standing.

Figure 12:
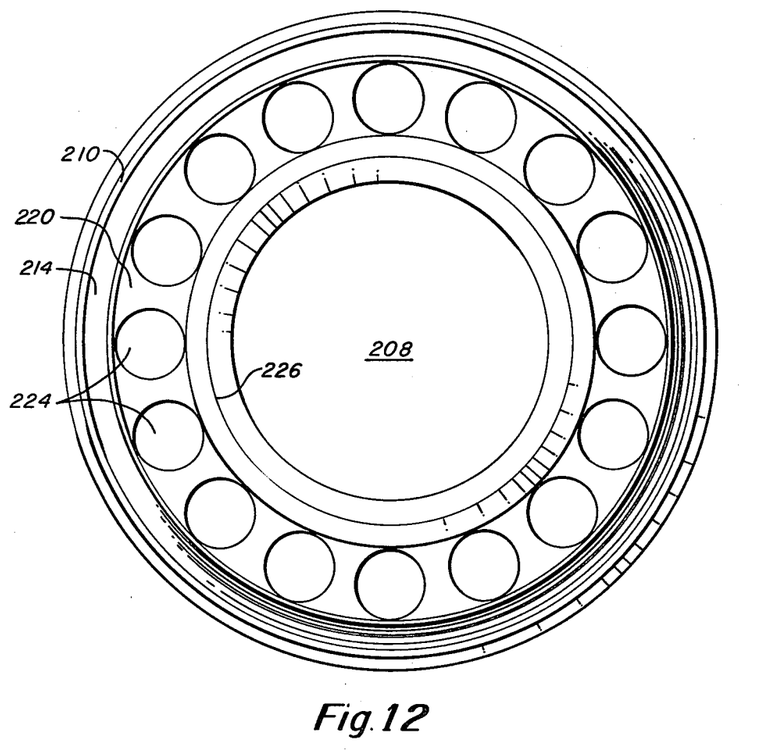
FIG. 12 is a plan view of one of the valve members in the assembly of FIG. 11.
Figure 13:
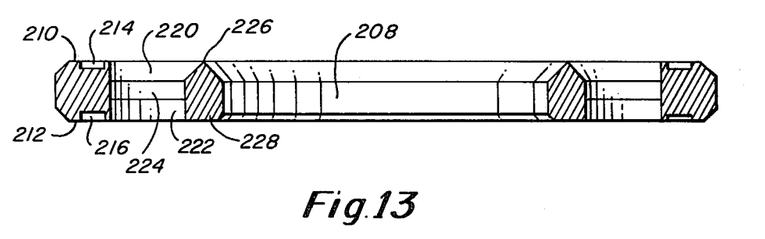
FIG. 13 is a cross sectional view of the valve member of FIG. 12.

Chamber grooves 220 and 222 are formed in each face of each disc valve. These grooves are joined by axial fluid conduits 224 drilled through the web between the chamber grooves. The chamber grooves 220 and 222 and the axial passages 222 jointly form the low pressure region into which the homogenized liquid is expressed.

Figure 14:
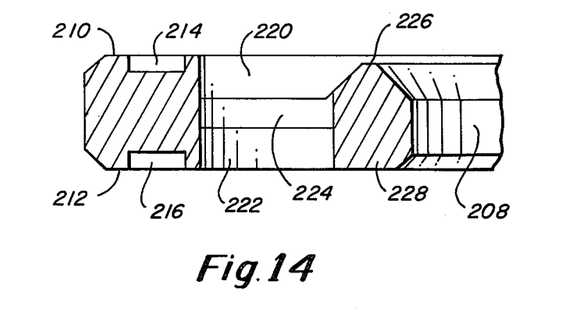
FIG. 14 is an enlarged view of a portion of FIG. 13.

The ridge formed between the center hole 208 and chamber groove 220 is chamfered at 45 degree angles to provide an annular knife edge 226. As shown in FIG. 14, that knife edge has a land distance of 0.015 inch and is axially spaced from the surface 210 by 0.0015 inch to provide an optimal slit gap. As in FIG. 1, that space may be provided by shims rather than a unitary rim. A flat valve surface 228 is aligned with the knife edge 226 on the opposite side of the disc valve. That valve surface 228 cooperates with the knife edge of another valve member to define a valve slit.

The blank disc valve 202 positioned at the bottom of the stack of valve members has a chamber groove 229 similar to the groove 220 in the disc valves. However, it does not include the opposite chamber groove or axial passages joining the chamber grooves. The blank disc valve is of a wider outside diameter than the other disc valves and is sealed to the housing 219 by a gasket 230. It is also sealed by a gasket 232 to the hub 234 of an inlet flange 236. The seals at the blank disc valve 202 prevent liquid from seeping beneath this valve. Such seepage would make cleaning of the assembly between processes difficult.

High pressure liquid to be homogenized is introduced into the center chamber formed by the holes 208 through a conduit 237 in the inlet flange 236. Pressure of that liquid is monitored by a pressure transducer 238 which provides a digital readout which may facilitate control of the system. Alternatively a pressure gauge may be used.

The bearing plate 204 includes chamber grooves 240 and 241 and axial fluid passages 242 joining those grooves. The bearing plate has no center hole so that it serves as the end to the center high pressure chamber in the stack of valve members. It also distributes the clamping force from the valve rod 206. A counterbore 244 is provided in the bearing plate to align the valve rod, thereby minimizing shifting of the valve rod and the resultant wobbling of that rod.

To minimize wear of the knife edge and flat valve surfaces, each of the disc valves is formed of exceptionally hard material having a hardness of about 60 on the Rockwell C scale. For use with dairy products stainless steel should be used. Suitable materials include that sold by Cabot Corporation under the trademark Stellite and that sold by Crucible Steel Company of America under the trademark Rexalloy 33. The clamping plate 204, however, is subjected to severe stress due to the high force exerted by high pressure liquid under the plate and the opposing downward force by the rod 206 at the center of the plate. Also, as will be discussed below, the bearing plate is subjected to great strain as it is flexed for control of the slit gap. For that reason, the bearing plate is made of a softer stainless steel such as 17-4 PH steel sold by Armco Steel Corporation which has a hardness of 44 on the Rockwell C scale. The annular valve surface on that plate is formed of a weld 246 of hard material such as Stellite. Alternatively, that ring of hard material 246 may be held to the bearing plate by a clearance fit or other means.

As indicated above, the slit gaps, and thus the homogenizing pressure for a given flow rate through the assembly, can be adjusted by flexing the bearing plate 204. If the hydraulic valve actuator applies just sufficient force to the valve rod 206 to clamp the valve assembly together with the rim surfaces abutting but without flexure of the plate 204, a gap of 0.0015 inch is maintained at each valve slit. By applying a greater force to the plate 204 by the rod 206, that plate can be caused to flex and reduce or completely close the gap of at least the endmost slit. With even further force at least the topmost disc valve can also be made to flex for reducing the gap of the next slit. In this way, the total cross sectional area of the valve slits is reduced and the homogenizing pressure for a given flow rate can be controlled. The thin web between the chamber grooves in the bearing plate and in each disc valve make those members more flexible to allow for control of the slit gaps with minimal actuating force.

As with the model of FIG. 10, by releasing the clamping force applied to the stack of valve members, the valve members can be allowed to spread apart by the spring force of the springs 238. The valve slits can thus be cleaned of any debris which may have collected. The model of FIG. 11 is designed for the use of from eleven to fifteen stages within the housing 219. By holding the length of the housing 219 constant even with changes in the number of disc valves within the housing, the piping and the like joining the valve assembly to the rest of the system need not be changed with each such modification. As a result, a stack of only twelve valve members does not completely fill the housing along its length. To prevent the valve members from spreading to the point where the springs are no longer seated within the spring grooves, a spacer sleeve 250 extends downwardly from the discharge flange 252. The length of the sleeve 250 is determined by the number of discs to be held within the assembly. The length of the valve rod 206 must also be modified for a change in the number of stages.

Homogenized liquid is discharged from the stack of valve members through the sleeve 250 and out a discharge conduit 254 in the discharge flange 252. The pressure of liquid in that discharge flange is monitored by a pressure transducer 256 or a pressure gauge.

Although the valve rod 206 may be operated by a hand wheel or the like, it is preferably operated by a hydraulic valve actuator mounted to the discharge flange 252. That actuator includes a housing 258 which forms a piston cylinder 259 and a actuator guide plate 260. A piston element 262 is formed at the head of the rod 206 and cup packing 264 is held against that piston element by a follower 266 and a valve rod nut 268. Hydraulic fluid is introduced into the chamber 270 over the piston.

The hydraulic valve actuator housing 258, the discharge flange 252, the housing 219 and the inlet flange 236 are held together by four studs 272 and nuts 274, two of which are shown in the background of FIG. 11.

Figure 15:
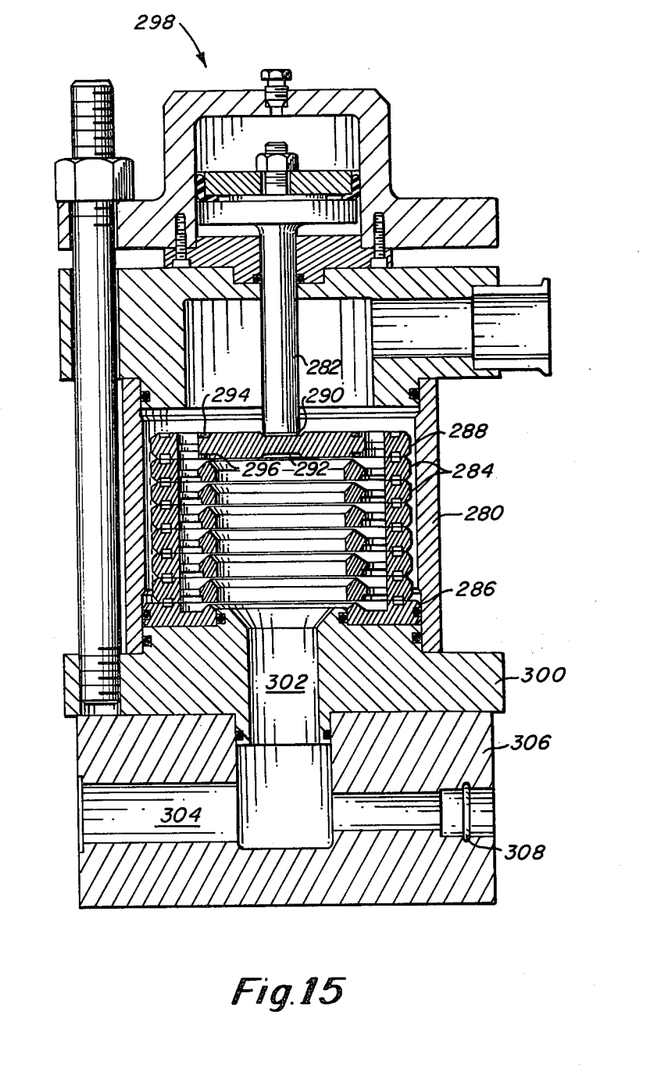
FIG. 15 is an elevational sectional view of yet another production model of the invention.

FIG. 15 shows yet another configuration. In this case the length of the housing 280 must be changed to change the number of stages within the assembly, but change in the length of the valve rod 282 or the use of a spacer sleeve are not required. The disc valves 284 and blank disc valve 286 are identical to those in the embodiment of FIG. 11. The bearing plate 288 is slightly modified, however, to make it reversible. Specifically, counterbores 290 and 292 are provided in each face of the bearing plate and welds 294 and 296 of hard material to form valve surfaces are provided in each face of the plate. The hydraulic valve actuator 298 is identical to that described with respect to FIG. 11. The inlet flange 300 includes a single center bore 302 which is connected to the liquid source by a conduit 304 in an adapter block 306. A pressure transducer 308 may be connected into this adapter block.

While the invention has been particularly shown and described with reference to preferred embodiments thereof, it will be understood by those skilled in the art that various changes in form and details may be made therein without departing from the spirit and scope of the invention as defined by the appended claims. For example, the valve diameters and liquid pressures can be modified to meet the needs of the user. A 3⅛ inch diameter knife edge is recommended for use in 3,000 to 14,000 gallon per hour systems operating at 1,500 pounds per square inch homogenizing pressure. A 2 3/16 inch diameter disc valve is recommended for smaller 1,000 to 3,000 gallon per hour systems. The higher homogenizing pressures required for ultrahigh temperature homogenization are also possible. However, whereas prior systems required 3,000 to 5,000 psi homogenizing pressures the systems disclosed here can operate at less than 3,000 psi.

I claim:

1. A valve assembly for homogenizing or mixing a fluid comprising valve members stacked within a housing and defining a central chamber and a peripheral chamber within the housing, at least one of the valve members having an annular valve seat protruding axially therefrom and spaced from an adjacent valve member by rigid spacing means to provide a valve slit between the central and peripheral chambers through which fluid is expressed, the spacing means being positioned between the valve members radially from the valve seat, wherein:

the valve members are clamped together with rigid spacing means therebetween by means of a rigid actuator operative from the exterior of said housing to exert a variable axial clamping force on an end valve member, which force is concentrated radially from rigid spacing means associated with said end valve member for flexing that valve member to adjust the gap of a valve slit formed by said end valve member.

2. A valve assembly as claimed in claim 1 wherein the rigid spacing means is positioned along the outer periphery of the valve members and the clamping force is concentrated centrally of the valve members.

3. A valve assembly as claimed in claim 1 comprising a plurality of valve members stacked to form a plurality of valve slits therebetween.

4. A valve assembly as claimed in claim 1 wherein the flexed valve member comprises a hard, annular valve surface fixed to a relatively soft main body.

5. A valve assembly as claimed in claim 1 wherein the valve seats are axially directed knife edges and the spacing of the knife edge valve seats from adjacent valve members is less than about 0.003 inches.

6. A valve assembly as claimed in claim 1 wherein the rigid actuator is a hydraulic valve actuator.

7. A valve assembly for homogenizing or mixing a fluid comprising a plurality of valve members stacked within a housing and defining a central chamber and a peripheral chamber within the housing, at least some of the valve members having annular, knife edge valve seats protruding axially therefrom and spaced from adjacent valve members by rigid spacing means to provide a plurality of valve slits between the central and peripheral chambers through which fluid is expressed, wherein:

the rigid spacing means are positioned between the valve members radially outward from the knife edge valve seats; and the valve members are clamped together with the rigid spacing means therebetween by means of a rigid actuator acting centrally against an end valve member to exert a variable axial clamping force on said end valve member, which force is concentrated against said end valve member radially from rigid spacing means associated with said end valve member for flexing at least said end valve member to adjust the gap of at least one of the valve slits.

8. A valve assembly as claimed in claim 7 wherein said end valve member comprises a hard, annular valve surface formed on a relatively soft main body.

9. A valve assembly as claimed in claim 8 wherein said end valve member has a counterbore formed at the center thereof for retaining a valve actuating rod.

10. A valve assembly as claimed in claim 9 wherein said end valve member includes a hard annular valve surface and a center counterbore on each surface thereof for reversible use of said end member.

11. A valve assembly as claimed in claim 7 wherein the spacing of the knife edge valve seats from adjacent valve members is less than about 0.003 inches.

12. A valve assembly as claimed in claim 7 wherein the valve members are biased away from each other by springs.

13. A valve assembly as claimed in claim 7 wherein at least one of the valve members is a rigid ring having a peripheral chamber groove in one face thereof concentric with a central hole in the ring, the groove partly defining a peripheral chamber and the resultant ridge between the central hole and the chamber groove forming a valve seat.

14. A valve assembly as claimed in claim 13 wherein valve members are spaced radially inward from said housing and the valve members are held in alignment by means of spring elements positioned in complementary spring grooves in adjacent valve members.

15. A valve assembly as claimed in claim 7 wherein the rigid actuator is a hydraulic valve actuator.

16. A valve assembly for homogenizing or mixing a fluid comprising a plurality of valve members stacked within a housing and defining a central chamber and a peripheral chamber within the housing, at least some of the valve members having annular, knife edge valve seats protruding axially therefrom and spaced less than 0.003 inch from adjacent valve members to provide a plurality of valve slits between the central and peripheral chambers through which fluid is expressed, the valve assembly comprising:

rigid spacing means positioned between the valve members radially outward from the knife edge valve seats;

valve actuating means for releasably clamping the valve members together into a tight stack, with rigid spacing means therebetween, by means of a rigid actuator operative from the exterior of said housing to exert an axial clamping force on the stack of valve members, which force is concentrated centrally on an end valve member radially inward from rigid spacing means associated with said end valve member for flexing at least said end valve member to adjust the gap of at least one of the valve slits; and spring elements between the valve members for exerting axial spring forces on the valve members to separate the valve members when the members are released by the valve actuating means, the valve members being thus separated to allow for substantially larger slit gaps for cleaning the slits, a valve slit gap between each valve seat and adjacent valve member being determined by said rigid spacing means independent of the spring elements in homogenizing or mixing operation, the valve members and rigid spacing means being fully compressed into a tight stack with the spring elements compressed therebetween.

17. A valve assembly as claimed in claim 16 wherein said end valve member comprises a hard, annular valve surface formed on a relatively soft main body.

18. A valve assembly as claimed in claim 16 wherein the spring elements are annular springs positioned in complementary spring grooves in the faces of adjacent valve members and the spring elements further serve to align the valve members in the stack.

19. A valve assembly as claimed in claim 16 wherein at least one of the valve members is a rigid ring having a peripheral chamber groove in one face thereof concentric with a central hole in the ring, the groove partly defining a peripheral chamber and the resultant ridge between the central hole and the chamber groove forming a valve seat.

20. A valve assembly as claimed in claim 19 wherein said at least one of the valve members further comprises:
   a flat valve surface aligned with the valve seat on the opposite face of the ring;
   a peripheral rim having flat axially directed surfaces, one surface being coplanar with the flat valve surface, the other surface being near coplanar with the valve seat but spaced axially a predetermined amount to assure a gap between the valve seat and the flat valve surface of a like valve member; and
   a plurality of axial fluid passages through the ring from the chamber groove.

21. A valve assembly as claimed in claim 20 further comprising a spring groove in each of said flat axially directed rim surfaces.

22. A valve assembly as claimed in claim 20 wherein said axially directed surface spaced a predetermined amount from the valve seat is on a shim.

23. A valve assembly as claimed in claim 16 wherein an end valve member is a rigid ring having a peripheral chamber groove in one face thereof concentric with a central hole in the ring, the groove partly defining a peripheral chamber and the resultant ridge between the central hole and the chamber groove forming a valve seat, the assembly having a fluid seal between the end valve member and the housing to prevent seepage of liquid behind the end valve member.

24. A valve assembly for homogenizing or mixing a fluid of the type comprising a plurality of valve members stacked within a housing and defining a central chamber and a peripheral chamber within the housing, at least some of the valve members having annular valve seats protruding axially therefrom and spaced from adjacent valve members by rigid spacing means to provide a plurality of valve slits between the central and peripheral chambers through which fluid is expressed, the valve assembly comprising:
   valve actuating means operative from the exterior of said housing for releasably clamping the valve members together into a tight stack, with rigid spacing means therebetween, to provide slits of predetermined gaps determined by the spacing means and actuator; and
   spring elements between the valve members for exerting axial spring forces on the valve members to separate the valve members when they are released by the valve actuating means, the valve members being thus separated to provide for substantially larger slit gaps for cleaning of the slits, a valve slit gap between each valve seat and adjacent valve member being determined by said rigid spacing means independent of the spring elements in homogenizing or mixing operation, the valve members and rigid spacing means being fully compressed into a tight stack with the spring elements compressed therebetween.

25. A valve assembly as claimed in claim 24 wherein the valve seats are axially directed knife edges and the spacing of the knife edge valve seats from adjacent valve members is less than about 0.003 inches.

26. A valve assembly as claimed in claim 24 wherein the spring elements are annular springs positioned in complementary spring grooves in the faces of adjacent valve members and the spring elements further serve to align the valve members in the stack.

27. A valve member suitable for a stacked configuration homogenizing valve assembly, the valve member comprising a rigid ring having a central hole and having opposite faces which provide a valve surface and a valve seat for respective valve slits, the rigid ring further comprising:
   a chamber groove in one face thereof concentric with the central hole in the ring;
   an annular knife-edge valve seat forming a ridge between the central hole and chamber groove;
   a flat valve surface aligned with the valve seat on the opposite face of the ring;
   a peripheral rim having flat axially directed surfaces, one surface being coplanar with the flat valve surface, the other surface being near coplanar with the valve seat but spaced axially a predetermined amount to form a rigid spacer which assures a gap between the valve seat and the flat valve surface of a like valve member; and
   a plurality of axial fluid passages through the ring from the chamber groove.

28. A valve member as claimed in claim 27 wherein the main body of the valve and the peripheral rim are formed in a unitary body.

29. A valve member as claimed in claim 27 wherein the rim includes a shim which provides the rim surface spaced axially from the valve seat.

30. A valve members as claimed in claim 27 wherein the rim surface is spaced less than 0.003 inches axially from the valve seat.

31. A valve member as claimed in claim 27 further comprising a spring groove in at least one of said peripheral rim surfaces.

32. A valve member as claimed in claim 31 comprising a spring groove in each of said peripheral rim surfaces.

33. A valve member suitable for a stacked configuration homogenizing valve assembly, the valve member comprising a rigid ring having a central hole and having opposite faces which provide a valve surface and a valve seat for respective valve slits, the rigid ring further comprising:
   a chamber groove in a face thereof concentric with the central hole in the ring;
   an annular knife edge valve seat forming a ridge between the central hole and chamber groove;

a flat valve surface aligned with the valve seat on the opposite face of the ring;

a peripheral rim having flat axially directed surfaces, one surface being coplanar with the flat valve surface, the other surface being near coplanar with the valve seat but spaced axially a predetermined amount less than 0.003 inch to form a rigid spacer which assures a gap between the valve seat and the flat valve surface of a like valve member;

a plurality of axial fluid passages through the ring from the chamber groove; and a spring groove in each of said peripheral rim surfaces.

34. A method of controlling the gap between a valve seat and opposing valve surface on opposing valve members comprising:

providing a predetermined gap between the valve seat and opposing valve surface by means of a rigid spacer spaced from the valve seat;

applying a force to at least one of the valve members to flex the valve member about the spacing means and thereby adjust the gap between the valve seat and opposing valve surface.

35. A method as claimed in claim 34 wherein the valve seats are annular knife-edge valve seats spaced radially inward from the spacer means and an axial actuating force is applied at the center of a valve member.

36. A method of controlling the gap between a valve seat and opposing valve surface on opposing valve members within a housing comprising:

providing a predetermined gap between the valve seat and opposing valve surface by means of a rigid spacer; and applying a force to at least one of the valve members by means of an actuator operative from the exterior of said housing to adjust the gap between the valve seat and opposing valve surface.

* * * * *